(12) United States Patent
Kawaguchi et al.

(10) Patent No.: US 11,101,552 B2
(45) Date of Patent: Aug. 24, 2021

(54) ANTENNA DEVICE

(71) Applicant: DENSO CORPORATION, Kariya (JP)

(72) Inventors: Kazushi Kawaguchi, Nisshin (JP);
Kazumasa Sakurai, Nisshin (JP);
Toshiya Sakai, Nisshin (JP); Asahi Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 346 days.

(21) Appl. No.: 16/078,590

(22) PCT Filed: Feb. 23, 2017

(86) PCT No.: PCT/JP2017/006880
§ 371 (c)(1),
(2) Date: Aug. 21, 2018

(87) PCT Pub. No.: WO2017/146164
PCT Pub. Date: Aug. 31, 2017

(65) Prior Publication Data
US 2019/0051977 A1 Feb. 14, 2019

(30) Foreign Application Priority Data

Feb. 23, 2016 (JP) .............................. JP2016-032214

(51) Int. Cl.
| | | |
|---|---|---|
| *H01Q 1/32* | (2006.01) | |
| *H01Q 15/14* | (2006.01) | |
| *H01Q 21/06* | (2006.01) | |
| *H01Q 13/08* | (2006.01) | |
| *G01S 7/03* | (2006.01) | |
| *G01S 13/931* | (2020.01) | |

(52) U.S. Cl.
CPC ........... *H01Q 1/3233* (2013.01); *G01S 7/032* (2013.01); *G01S 13/931* (2013.01); *H01Q 1/32* (2013.01); *H01Q 1/3283* (2013.01); *H01Q 13/08* (2013.01); *H01Q 15/14* (2013.01); *H01Q 21/06* (2013.01); *G01S 2013/93275* (2020.01)

(58) Field of Classification Search
CPC ...... H01Q 1/3233; H01Q 1/32; H01Q 1/3283; H01Q 13/08; H01Q 15/14; H01Q 21/06; H01Q 2013/93275; G01S 7/032; G01S 13/931
USPC .......................................................... 342/27
See application file for complete search history.

(56) References Cited

U.S. PATENT DOCUMENTS 4,788,515 A * 11/1988 Wong ...................... H01P 1/183
333/156
5,162,803 A * 11/1992 Chen ....................... H01Q 3/22
342/372

(Continued)

FOREIGN PATENT DOCUMENTS

JP 2009/153095 7/2009
JP 2011/193345 9/2011

*Primary Examiner* — Vladimir Magloire
*Assistant Examiner* — Nuzhat Pervin
(74) *Attorney, Agent, or Firm* — Maschoff Brennan

(57) ABSTRACT

An antenna device includes a dielectric substrate, a ground plane, an antenna unit, a reflection unit, and an interruption unit. The interruption unit includes a plurality of second conductor patches disposed around the antenna unit, and a plurality of through-holes permitting electrical conduction between each of the second conductor patches and the ground plane, and interrupts a surface current flowing on a surface of the dielectric substrate.

9 Claims, 18 Drawing Sheets

(56) References Cited

U.S. PATENT DOCUMENTS

| | | | | | |
|---|---|---|---|---|---|
| 5,995,047 | A | * | 11/1999 | Freyssinier | H01Q 1/38 343/700 MS |
| 6,667,714 | B1 | * | 12/2003 | Solondz | H01Q 1/246 342/368 |
| 6,809,688 | B2 | * | 10/2004 | Yamada | H01Q 1/243 343/700 MS |
| 6,870,517 | B1 | * | 3/2005 | Anderson | H01Q 1/366 343/702 |
| 7,504,999 | B2 | * | 3/2009 | Brown | H01Q 3/46 343/700 MS |
| 7,675,466 | B2 | * | 3/2010 | Gaucher | H01Q 21/0075 343/700 MS |
| 8,471,775 | B2 | * | 6/2013 | Nakabayashi | H01Q 13/206 343/731 |
| 9,269,999 | B2 | * | 2/2016 | Toyao | H01P 1/2005 |
| 9,822,159 | B2 | * | 11/2017 | Takasaki | H05K 1/0236 |
| 10,361,483 | B2 | * | 7/2019 | Maruyama | H01Q 3/24 |
| 2003/0103006 | A1 | * | 6/2003 | Yamada | H01L 23/66 343/700 MS |
| 2006/0022866 | A1 | * | 2/2006 | Walton | H01Q 9/0407 342/194 |
| 2006/0055604 | A1 | * | 3/2006 | Koenig | H01Q 21/065 343/700 MS |
| 2009/0273528 | A1 | * | 11/2009 | Rudant | H01Q 1/48 343/725 |
| 2011/0045764 | A1 | * | 2/2011 | Maruyama | H01Q 15/0086 455/7 |
| 2011/0163921 | A1 | * | 7/2011 | Chirila | H01Q 1/526 343/702 |
| 2011/0260925 | A1 | * | 10/2011 | Chirila | H01Q 9/04 343/700 MS |
| 2012/0032865 | A1 | * | 2/2012 | Toyao | H01Q 15/14 343/835 |
| 2013/0229296 | A1 | * | 9/2013 | Maruyama | H01Q 15/008 342/5 |
| 2014/0015730 | A1 | * | 1/2014 | Anguera Pros | H01Q 1/24 343/860 |
| 2015/0022414 | A1 | * | 1/2015 | Maruyama | H01Q 3/46 343/836 |
| 2015/0054713 | A1 | * | 2/2015 | Takasaki | H05K 1/0236 343/909 |
| 2015/0070246 | A1 | * | 3/2015 | Maruyama | H01Q 15/008 343/912 |
| 2015/0097720 | A1 | * | 4/2015 | Steinhauer | G01S 13/02 342/175 |
| 2016/0003934 | A1 | * | 1/2016 | Ashida | G01S 7/03 342/21 |
| 2017/0207529 | A1 | * | 7/2017 | Maruyama | H01Q 3/44 |

* cited by examiner

FIG.4
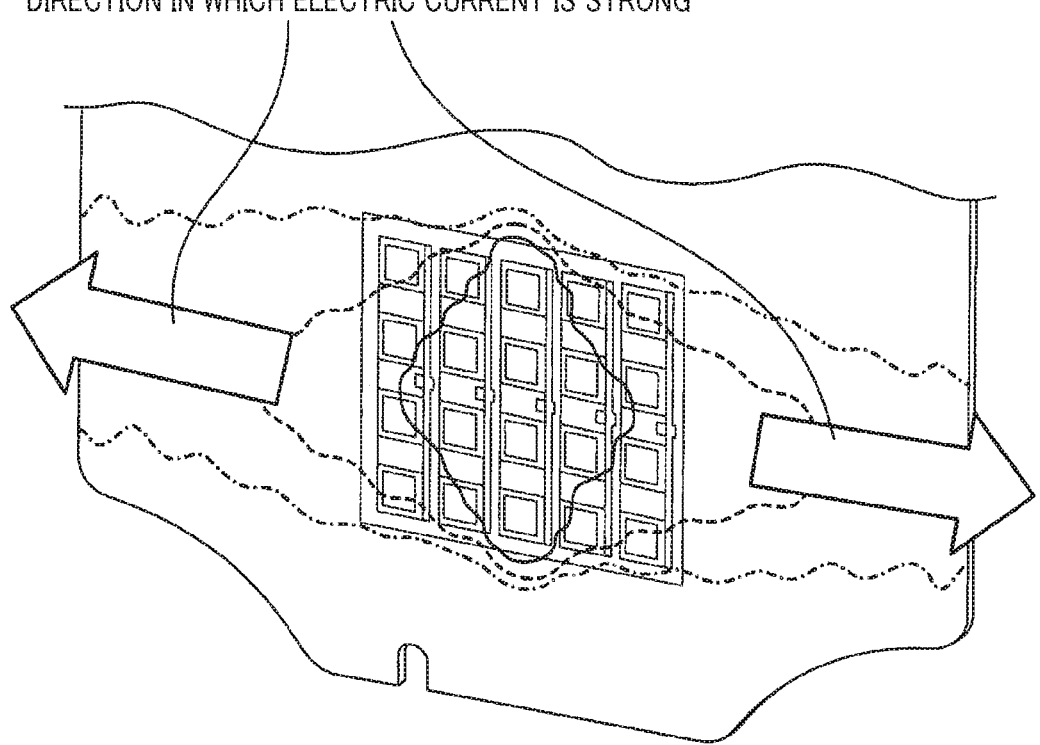
DIRECTION IN WHICH ELECTRIC CURRENT IS STRONG
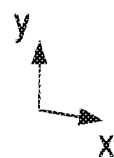

NORMAL SUBSTRATE

PHASE DELAY

EQUAL PHASE DIFFERENCE
(CORRESPONDING TO REFLECTION AT PLANAR REFRACTIVE SUBSTRATE)

FIG.8

PHASE DIFFERENCE BASED ON B1 [deg]

|  | B1 | B2 | B3 | B4 | B5 | B6 | B7 |
|---|---|---|---|---|---|---|---|
| COMPARATIVE EXAMPLE 1: NORMAL SUBSTRATE | 0 | 0 | 0 | 0 | 0 | 0 | 0 |
| EXAMPLE 1, COMPARATIVE EXAMPLE 2: FIXED PHASE DIFFERENCE OF 100 DEGREES | 0 | 100 | 200 | 300 | 400 | 500 | 600 |

PHASE DELAY

INCLINED PHASE DIFFERENCE
(EQUIVALENT TO REFLECTION ON CURVED SUBSTRATE)

ANTENNA DEVICE

CROSS REFERENCE TO RELATED APPLICATIONS

This application is a national stage application under 35 U.S.C. § 371(c) of PCT Application No. PCT/JP2017/00688, filed on Feb. 23, 2017 and is based on and claims the benefit of priority from Japanese Patent Application No. 2016-032214 filed Feb. 23, 2016, and the entire disclosure of Japanese Patent Application No. 2016-032214 is incorporated herein by reference.

TECHNICAL FIELD

The present disclosure relates to an antenna device installed in an environment in which radio waves are reflected.

BACKGROUND ART

A patch antenna formed on a dielectric substrate is used, for example, in radar which monitors the surroundings of a mobile object such as a vehicle or an aircraft. The patch antenna includes a radiation element having a patched pattern formed on one surface of the dielectric substrate and a ground plane formed on another surface of the substrate.

In a case of using the patch antenna as an antenna for an in-vehicle radar device, the patch antenna may be mounted in a bumper of a vehicle, for example. In this case, part of radio waves radiated from an antenna is reflected off an inner wall of the bumper and enters a radiation surface of the antenna where the part of radio waves is re-reflected, if the direction of the re-reflection is the same as the direction of the radiation, a re-reflected wave and a radiation wave may interfere with each other and adversely affect the gain of the antenna.

Patent Literature (PTL) 1 discloses a radio communication system which uses a scatterer in the shape of a polyhedron and causes electromagnetic waves incident on the scatterer to be secondarily radiated in a desired direction at an angle different from an incident angle. This radio communication system is configured such that the electromagnetic wave incident on the scatterer at a first angle is refracted off a boundary surface between the air and the scatterer in the direction at a second angle and then is secondarily radiated at an angle different from the first angle, on the boundary surface through which the refracted electromagnetic wave is emitted from the inside of the scatterer into the air.

CITATION LIST

Patent Literature

[PTL 1] JP 2009-153095 A

SUMMARY OF THE INVENTION

In the above-mentioned antenna patch, when such a scatterer is installed around the radiation element, the reflection wave from the bumper may be re-reflected in a direction different from that of the radiation wave so that the interference between the re-reflected wave and the radiation wave is inhibited. However, since the shape of the scatterer is a polyhedron, the installation of the scatterer on the dielectric substrate makes the shape of the antenna device complex, which is problematic. Furthermore, a detailed study by the inventors revealed the problem that if the radiation element and the above-mentioned scatterer are formed on the same dielectric substrate, a surface wave flowing on a surface of the substrate from the radiation element is secondarily radiated from the above-mentioned scatterer when the radiation element is supplied with power. In addition, directional ripples may increase as a result of the radiation wave radiated from the scatterer interfering with the radiation wave radiated from the antenna, which reveals another problem.

One aspect of the present disclosure is desirably to provide an antenna device which, even when installed in an environment in which radio waves are reflected, sufficiently suppresses the effect of the reflection from occurring and exhibits excellent directionality.

One aspect of the present disclosure is an antenna device which includes a dielectric substrate, a ground plane, an antenna unit, a reflection unit, and an interruption unit. The ground plane is formed on one surface of the dielectric substrate and functions as an antenna ground surface. The antenna unit is formed on another surface of the dielectric substrate and includes an antenna pattern configured to function as an array antenna. The reflection unit includes a plurality of first conductor patches which are disposed around the antenna unit and function as a reflection plate, and reflects an incident wave in a direction different from a direction of a radiation wave radiated from the antenna unit. The interruption unit includes a plurality of second conductor patches disposed around the antenna unit and a plurality of through-holes permitting electrical conduction between each of the plurality of second conductor patches and the ground plane, and interrupts a surface current flowing on a surface of the dielectric substrate.

According to the present disclosure, the incident wave incident on the reflection unit is reflected in a direction different from that of the radiation wave radiated from the antenna unit. Thus, it is possible to curb the reflection intensity of a re-reflected wave heading in the same direction as the radiation wave radiated from the surface of the dielectric substrate when the radiation wave is reflected in a radiation direction and then reaches the reflection unit and is re-reflected. Furthermore, when the surface current flowing on the surface of the dielectric substrate propagates to the interruption unit, the surface current is interrupted; thus, radiation of the surface current from the reflection unit can be inhibited. This allows a reduction in the directional ripples of the antenna device. Therefore, even when the antenna device is installed in an environment in which radio waves are reflected, the effect of the reflection wave can be sufficiently suppressed from occurring, and excellent directionality can be exhibited.

Note that the reference signs in parentheses stated in the claims indicate associations with specific elements in the embodiment to be described later as one aspect and do not limit the technical scope of the present disclosure.

BRIEF DESCRIPTION OF THE DRAWINGS

FIG. 4 is an x-y plan view showing the intensity of an electric current flowing on a surface of a substrate from an antenna unit when the antenna unit is supplied with power;

FIG. 8 is a list showing the phase difference of a reflection wave occurring between blocks in Example 1 with Comparative Example 2 and Comparative Example 1;

DESCRIPTION OF THE EMBODIMENTS

Hereinafter, embodiments for implementing the present disclosure will be described with reference to the drawings.

First Embodiment

[1. Configuration]

An antenna device 1 is used in millimeter-wave radar for detecting various targets present in the vicinity of a vehicle, and is mounted in a bumper of the vehicle.

Figure 1:
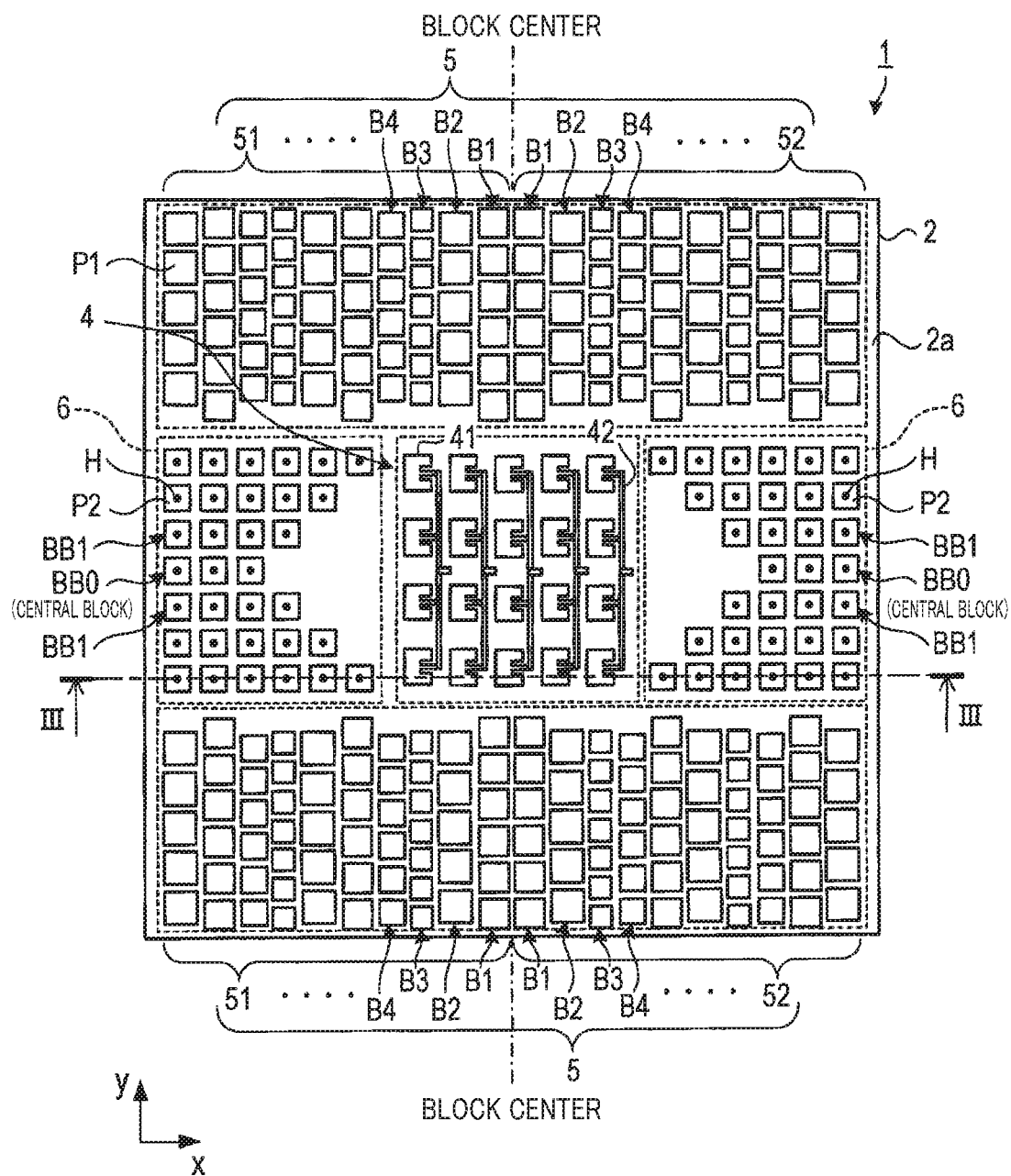
FIG. 1 is an x-y plan view which is a front view of an antenna device.
Figure 2:
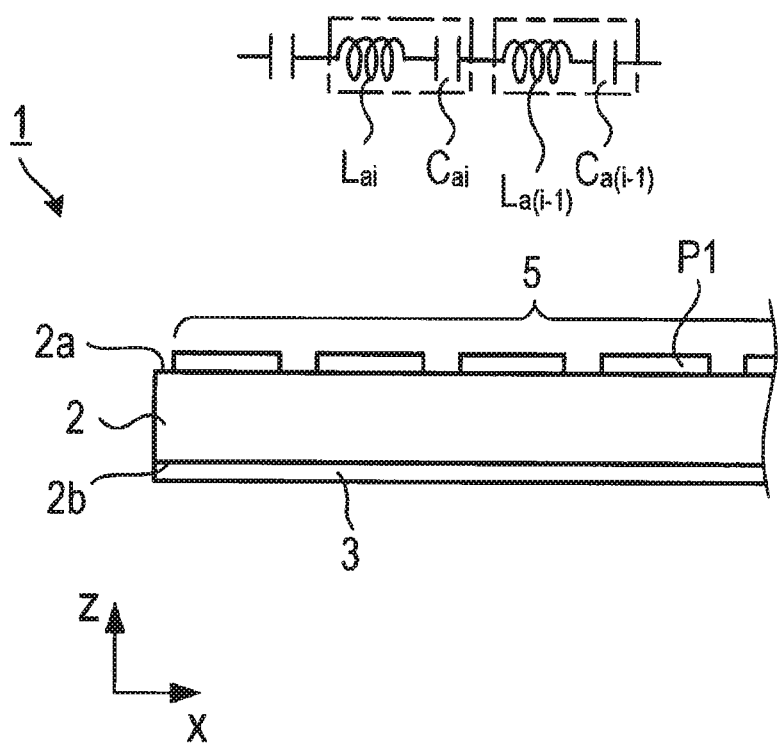
FIG. 2 is an x-z plan view which is a side view of the antenna device.
Figure 3:
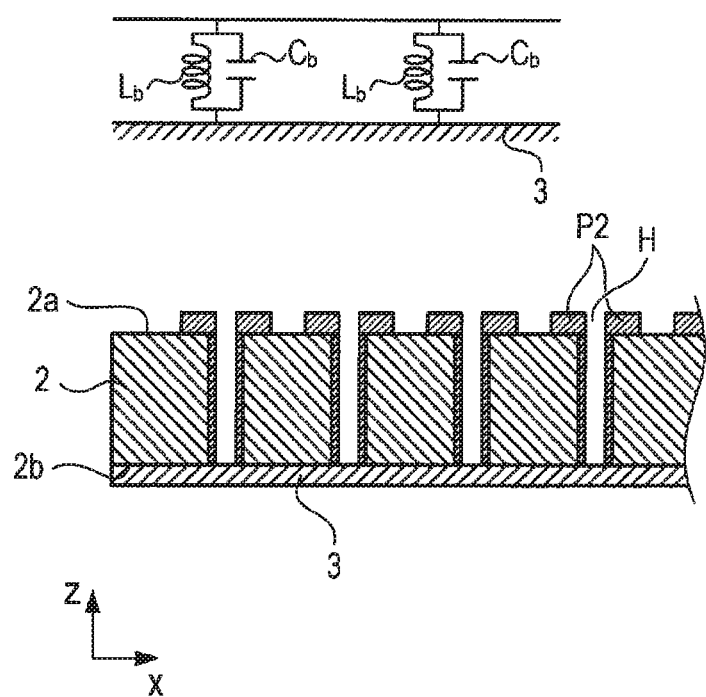
FIG. 3 is a cross-sectional view of the antenna device taken along a line III-III.

As shown in FIGS. 1 to 3, the antenna device 1 is formed of a copper pattern formed on a rectangular dielectric substrate. Hereinafter, one surface of the dielectric substrate 2 will be referred to as a substrate front face 2a, and another surface of the dielectric substrate 2 will be referred to as a substrate back face 2b. A direction following one side of the dielectric substrate 2 will be referred to as an x-axis direction, a direction following another side of the dielectric substrate 2 that is orthogonal to the x-axis direction will be referred to as a y-axis direction, and a normal direction of the substrate front face 2a will be referred to as a z-axis direction.

A ground plane 3 including a copper pattern covering the entire surface of the substrate back face 2b is formed on the substrate back face 2b. An antenna unit 4 is formed on substrate front face 2a, at an approximate center thereof, and a reflection unit 5 and an interruption unit 6 are formed around the antenna unit 4. Hereinafter, the substrate front face 2a may also be referred to as a radiation surface 2a.

The antenna unit 4 includes a plurality of array antennas aligned along the x-axis direction. Each of the array antennas includes a plurality of rectangular patch antennas 41 arranged along the y-axis direction, and a power supply line 42 which supplies power to each of the patch antennas 41. The antenna unit 4 is configured such that the polarization direction of a radio wave transmitted and received by the antenna unit 4 matches the x-axis direction.

The reflection unit 5 is configured by two-dimensionally arranging rectangular conductor patches P1 each including a copper pattern. The reflection unit 5 has a phase control structure in which the phase of a reflection wave is controlled when the radio wave incident on the reflection unit 5 is reflected. Specifically, the reflection unit 5 has a function of curbing the reflection intensity of the reflection wave heading in the same direction as the radiation wave radiated from the antenna unit 4 by adjusting the phase of the reflection wave.

Meanwhile, the interruption unit 6 is configured by two-dimensionally arranging through-holes H and rectangular conductor patches P2 each including a copper pattern. The interruption unit 6 has an electromagnetic band gap (EBG) structure in which the surface current is interrupted. The EBG structure herein has a function of stopping the propagation of at least the surface wave. The surface current, which is also referred to as a surface wave, is an electric current flowing on the radiation surface 2a from the antenna unit 4 toward an end of the dielectric substrate 2 when power is supplied from the power supply line 42 to the patch antenna 41.

In this way, in order to suppress the effects of both the reflection wave and the surface current from occurring, two structures having different functions are provided in combination on the radiation surface 2a. Details of the phase control structure and the EBG structure will be described later.

As shown in FIG. 4, when power is supplied from the power supply line 42 to each patch antenna 41, the surface current mainly flows from the antenna unit 4 in the polarization direction of the radio wave transmitted and received by the antenna unit 4. In FIG. 4, the electric current flowing in the part enclosed by the solid line is 4 to 5 A/m, the electric current flowing in the part enclosed by the broken line and the solid line is 3 to 4 A/m, the electric current flowing in the part enclosed by the chain line and the broken line is 1 to 3 A/m, and the outside of the chain line is 1 A/m or less. This means that the surface current is likely to flow in the above-mentioned polarization direction of the radio wave and is less likely to flow in a direction orthogonal to the above-mentioned polarization direction of the radio wave.

Thus, in the antenna device 1, the interruption unit 6 is installed in the above-mentioned polarization direction of the radio wave with respect to the antenna unit 4, and the reflection unit 5 is installed in the direction orthogonal to the above-mentioned polarization direction of the radio wave, with respect to the antenna unit 4.

More specifically, the reflection units 5 are installed on opposite sides of the antenna unit 4 and extended from ends of the radiation surface 2a to ends of the antenna unit 4 in the y-axis direction. Furthermore, the reflection units 5 are extended between both ends of the radiation surface 2a in the x-axis direction. Meanwhile, the interruption units 6 are installed and extended between the both ends of the antenna unit 4 in the y-axis direction. More specifically, the interruption units 6 are installed on opposite sides of the antenna unit 4 and extended from the ends of the radiation surface 2a to ends of the antenna unit 4 in the x-axis direction. The phase control structure of the reflection unit 5 and the EBG structure of the interruption unit 6 will be described below.

[1-1. Phase Control Structure]

The conductor patch P1 is formed into a square, and the length of one side of the square is set to less than a wavelength of the antenna device 1 at the operating frequency. More specifically, in order to provide a function of controlling the phase of the reflection wave, the length of one side of the conductor patch P1 is set to at most ¾ of the effective wavelength at the above-mentioned operating frequency as will be described later. The conductor patch P1 corresponds to a first conductor patch.

The conductor patches P1 of the same size are arranged in one line along the y-axis direction, and the conductor patches P1 of the same size arranged in this one line foam a block B. The blocks B are aligned along the x-axis direction, and the sizes of the conductor patches P1 included in the blocks B are different from each other. In other words, the block alignment direction matches the x-axis direction. Note that the gap between the conductor patches P1 in the block B and the gap between the conductor patches P1 located in different blocks B are each set to a fixed size.

The reflection unit 5 defines, as a block center, a line that passes through the center position in the x-axis direction and extends along the y-axis direction, and is formed of two portions 51 and 52 bordered at this block center. The blocks B forming these two portions 51 and 52, i.e., the conductor patches P1, have line symmetry with respect to the block center. Hereinafter, in each of the portions 51 and 52, a block closest to the block center will be denoted as B1, and the remaining blocks B further away from the block center will be sequentially denoted as B2, B3, etc.

In the reflection unit 5, the conductor patch P1 has an inductance component, and the gap between the conductor patches P1 has a capacitance component. As shown in FIG. 2, an equivalent circuit of the reflection unit 5 is a plurality of series-connected circuits per unit area each including inductance Lai and capacitance Cai. The inductance Lai and the capacitance Cai represent the inductance component and the capacitance component per unit area. The inductance component causes a phase delay of the electric current flowing on the radiation surface 2a, and the capacitance component causes a phase lead of the electric current flowing on the radiation surface 2a.

Using these properties, each block Bi included in the reflection unit 5 is designed to have a structure that meets the following conditions (1) to (3): (1) The phase characteristic of the reflection wave has line symmetry with respect to the block center; (2) The phase delay increases with an crease in the distance from the block center; and (3) The phase differences between adjacent blocks B are equal. In other words, there is an equal phase difference.

Here, the designing includes adjusting the size of the conductor patch P1 included in each block Bi.

[1-2 EBG Structure]

The conductor patch P2 is formed into a square, and the length of one side of the square is set to less than the wavelength λ of the antenna device 1 at the operating frequency. More specifically, in order to provide a function of interrupting the surface current, the length of one side of the conductor patch P2 is set to at most ½ of the effective wavelength at the above-mentioned operating frequency. The conductor patch P2 corresponds to a second conductor patch.

The conductor patches P2 of the same size are arranged in one line along the x-axis direction from the ends of the radiation surface 2a, and the conductor patches P2 of the same size arranged in this one line form a block BB. The block BB is arranged along the y-axis direction, and the sizes of the conductor patches P2 included in each block BB are fixed. The gap between the conductor patches P2 in the block BB and the gap between the conductor patches P2 located in different blocks BB are each set to a fixed size.

The interruption unit 6 has line symmetry with respect to a block BB0 provided at the center position in the y-axis direction. Hereinafter, the blocks BB closer to the block BB0 at the center will be sequentially denoted as BB1, BB2, . . . . The number of conductor patches P2 included in the block BBC is lesser with a shorter distance to the center position in the y-axis direction. In other words, the distance in the x-axis direction from the antenna unit 4 to the block BBi increases with a shorter distance from the block BBi to the center position in the y-axis direction. As a result of changing the distance from the antenna unit 4 to the block BBi in this way, the interruption position of the surface current is different in the y-axis direction. Note that it is sufficient that the distance from the antenna unit 4 to each block BBi be non-uniform, and the number of conductor patches P2 included in the block BBi may increase, for example, with a shorter distance to the center position in the y-axis direction.

As shown in FIG. 3, a through-hole H is formed at each conductor patch P2 and penetrates the conductor patch P2 and the ground plane 3 so that the conductor patch P2 and the ground plane 3 are in electrical conduction. The diameters of all the through-holes H are set to a fixed size. In other words, in the EBG structure, the plurality of conductor patches P2 and the plurality of through-holes H have uniform structures.

In the interruption unit 6, the through-hole H has an inductance component, and the gap between the conductor patch P2 and the ground plane 3 has a capacitance component. As shown in FIG. 3, an equivalent circuit of the interruption unit 6 is a plurality of parallel-connected circuits per unit area each including inductance Lb and capacitance Cb, connected in parallel between the radiation surface 2a and the ground plane 3. When the operating frequency of the antenna device 1 becomes the resonance frequency of the parallel-connected circuits each including inductance Lb and capacitance Cb, the surface current is interrupted.

[2. Design]

[2-1. Phase Control Structure]

Figure 5:
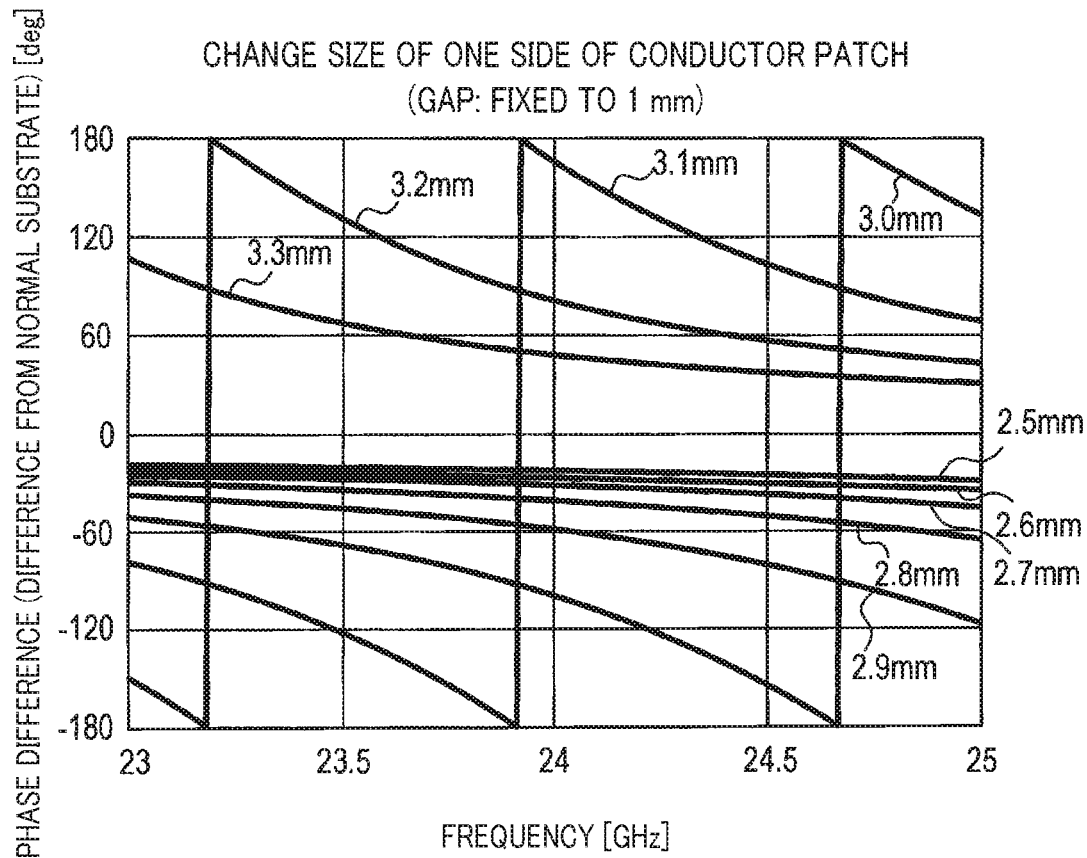
FIG. 5 is a graph showing, for various sizes of a conductor patch, the phase of a reflection wave on the conductor patch with respect to the frequency characteristics which is determined using the phase of the reflection wave on a normal substrate as a reference.

The phase characteristic (hereinafter, the refection characteristic) of the reflection wave at the conductor patch P1 is shown in FIG. 5, using, as a reference, the phase of the reflection wave at a normal substrate which is a substrate on which only the antenna unit 4 is installed. Note that the gap between the conductor patches P1 is fixed to 1 mm, and the length of one side of the conductor patch P1 is changed between 2.5 mm and 3.3 mm. When the operating frequency is set to 24.15 GHz, the length of one side, 3.0 mm, corresponds to ½ of the effective wavelength.

As shown in FIG. 5, when the size of the conductor patch P1 is fixed, the phase delay increases as the operating frequency increases. When the operating frequency is fixed, the phase delay increases as the size of the conductor patch P1 increases. Note that the phase difference is in the range of −180 to 180 degrees, and the phase difference of −180 degrees is treated the same way as the phase difference of 180 degrees. In other words, the difference in phase from a normal substrate is in the range of 0 to 180 degrees. For example, the phase delay of −240 degrees is the same as the phase lead of 60 degrees, and the difference in phase is 60 degrees. Thus, when the size of the conductor patch P1 is set larger with a fixed operating frequency, the difference in phase increases until the size of the conductor patch P1 reaches a predetermined size. When the size of the conductor patch P1 reaches the predetermined size, the difference in phase is 180 degrees, and if the size of the conductor patch P1 is set larger than the predetermined size, the difference in phase decreases from 180 degrees. Thus, if the size of the conductor patch P1 is too large, the difference in phase from a normal substrate becomes excessively small, and the advantageous effect of curbing the intensity of the reflection wave heading in the same direction as the radiation wave is reduced. Specifically, when the size of the conductor patch P1 is greater than ¾ of the effective wavelength, the difference in phase from a normal substrate becomes excessively small, and thus the length of one side of the conductor patch P1 is desirably set to at most ¾ of the effective wavelength.

In the present embodiment, the size of the conductor patch P1 in the block Bi serving as a reference is arbitrarily determined, and the size of the conductor patch P1 in a block adjacent to the block having the determined size is set, using the relationship shown in FIG. 5, to obtain a preset phase difference at a predetermined operating frequency. By sequentially repeating this, the sizes of the conductor patches P1 in all the blocks Bi are designed.

[2-2. EBG Structure]

The size of the conductor patch P2 and the diameter of the through-hole H are designed such that the resonance frequency of the parallel circuit including the inductance Lb of the through-hole H and the capacitance Cb between the conductor patch P2 and the ground plane 3 becomes the operating frequency of the antenna device 1. The capacitance Cb increases as the size of the conductor patch P2 increases, and the inductance Lb decreases as the diameter of the through-hole H increases. Note that if the length of one side of the conductor patch P2 is set greater than ½ of the effective wavelength at the above-mentioned operating frequency, the resonance frequency of the parallel circuit and the above-mentioned operating frequency do not match, for example, which may cause a failure to obtain the advantageous effect of interrupting the surface current. Thus, the length of one side of the conductor patch P2 is set to at most ½ of the effective wavelength at the above-mentioned operating frequency.

[3. Functions]

Figure 6:
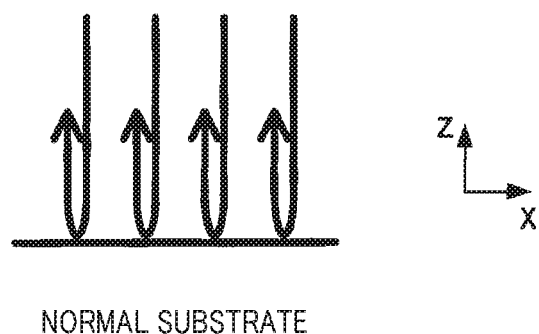
FIG. 6 is a schematic illustration of a reflection direction on a radiation surface of a normal substrate including no conductor patches.

In a case of a normal substrate having the radiation surface 2a on which only the antenna unit 4 is installed or in a case where the reflection unit 5 is designed such that the phase difference of the reflection wave between the blocks Bi becomes 0 degrees, the incident wave from the z-axis direction bounces off the radiation surface 2a, in the same phase at each location thereon, as shown in FIG. 6. As a result, the reflection wave heads in the arrival direction of the incident wave.

Figure 7:
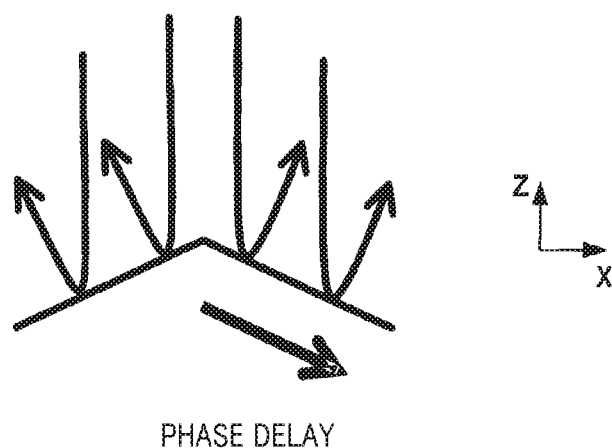
FIG. 7 is a schematic illustration of reflection directions on a radiation surface of a substrate in which the phase difference of a reflection wave occurring between conductor patches located in different blocks is fixed.

In contrast, the present embodiment is designed such that the phase of the reflection wave is different at each block Bi and the phase difference between the blocks B is fixed. Thus, as shown in FIG. 7, the incident wave from the z-axis direction is reflected off the radiation surface 2a, and the phase delay of this reflection wave increases with an increase in the distance from the block center. Note that this phase delay is proportional to the distance from the block center. As a result, the reflection wave is reflected in a predetermined direction at a certain angle with respect to the arrival direction of the incident wave. This means that the reflection characteristic equivalent to that of the reflection on a planar refractive substrate curved into a peaked shape is obtained.

Here, if the reflection unit 5 is installed on the entire surface around the antenna unit 4, the surface current mainly flowing in the polarization direction of the radio wave impinges on the conductor patch P1, the edge of the dielectric substrate 2, or the like, and thus is radiated. The radiated surface current interferes with the radiation wave radiated from the antenna unit 4, becoming a factor for increasing the directional ripples of the antenna device 1.

In addition, if the interruption unit 6 is installed on the entire surface around the antenna unit 4, although the surface current is interrupted, the incident wave from the z-axis direction is reflected in the same direction as the arrival direction of the incident wave. In the interruption unit 6, the phase difference of the reflection wave between adjacent conductor patches P2 is 0 degrees in both the x-axis direction and the y-axis direction. Thus, when the incident wave incident on the interruption unit 6 is reflected, the reflection wave heads in the arrival direction of the incident wave.

In the present embodiment, the surface current is favorably suppressed from flowing by the interruption unit 6 installed in the polarization direction of the radio wave in which the surface current is likely to flow, with respect to the antenna unit 4. Furthermore, the effect of the reflection wave is suppressed from occurring by the reflection unit 5 installed in the direction which is orthogonal to the polarization direction of the radio wave and in which the surface current is less likely to flow, with respect to the antenna unit 4. Thus, not only the surface current is suppressed from flowing, but also the effect of the reflection wave is suppressed from occurring.

Note that although the radiation of this surface current is sufficiently small as compared to the radiation of the surface current from the conductor patch P1, the surface current is also radiated from an interruption surface of the interruption unit 6 the edge of the dielectric substrate 2, or the like. In the present embodiment, the interruption unit 6 is configured such that the interruption position of the surface current is non-uniform in the y-axis direction, and thus the phase of the radiation wave of the surface current on the interruption surface is non-uniform, resulting in the effect of the radiation of the surface current being favorably suppressed from occurring.

[4. Advantageous Effects]

According to the first embodiment described above, the following advantageous effects are obtained.

(1) In the antenna device 1, the reflection unit 5 and the interruption unit 6 are installed on the radiation surface 2a. With the reflection unit 5, the reflection direction of the reflection wave reflected by the reflection unit 5 can be different from the radiation direction of the antenna unit 4. As a result, even when the antenna device 1 is installed in a bumper of a vehicle, the effect of interference based on the reflection wave from the bumper can be suppressed from occurring. Furthermore, with the interruption unit 6, the surface current flowing on the radiation surface 2a when the antenna unit 4 is supplied with power can be interrupted. This allows a reduction in the directional ripples of the antenna device 1. Thus, even when the antenna device 1 is installed in a bumper of a vehicle, the effect of the reflection wave can be sufficiently suppressed from occurring, and excellent directionality can be exhibited.

(2) In the antenna device 1, the interruption unit 6 is installed in the polarization direction of the radio wave in which the surface current is likely to flow, with respect to the antenna unit 4, and the reflection unit 5 is installed in the direction which is orthogonal to the polarization direction of the radio wave and in which the surface current is less likely to flow, with respect to the antenna unit 4. Thus, not only the propagation of the surface current can be favorably suppressed from flowing, but also the effect of the reflection wave can be suppressed from occurring.

[5. Experiment]

Figure 9:
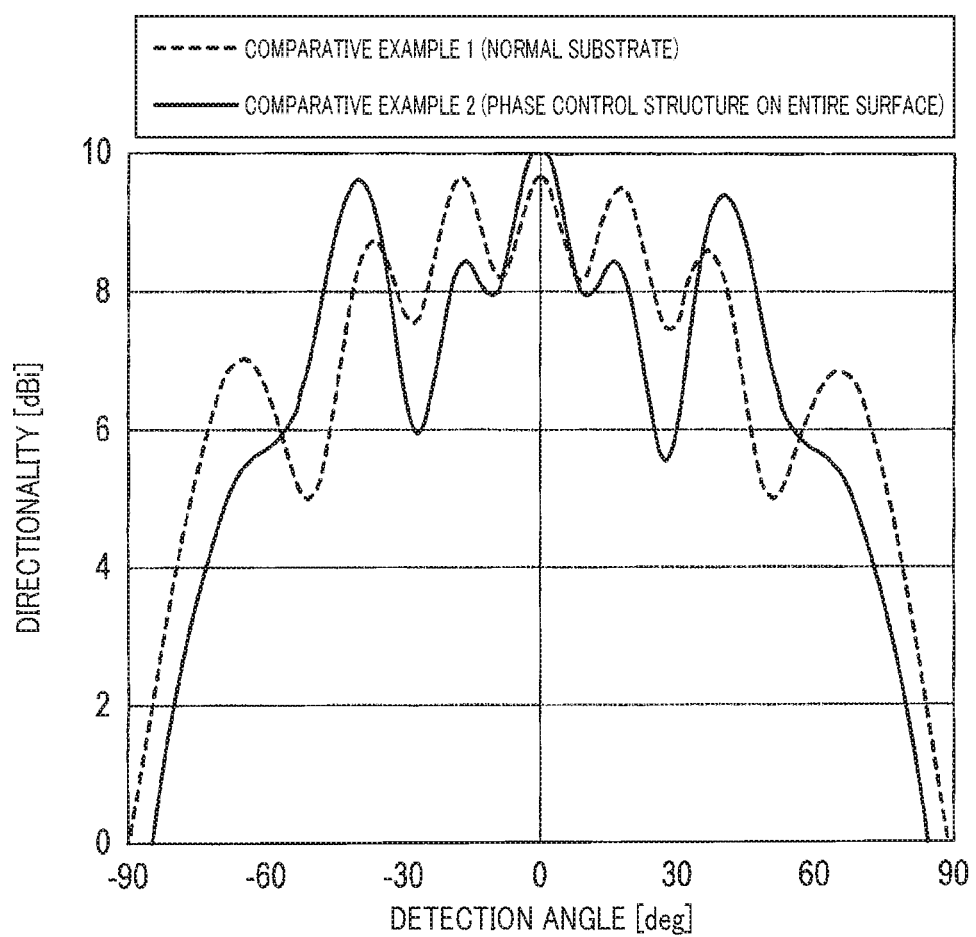
FIG. 9 is a graph showing the result of a simulation for determining the directionality of an antenna device.
Figure 10:
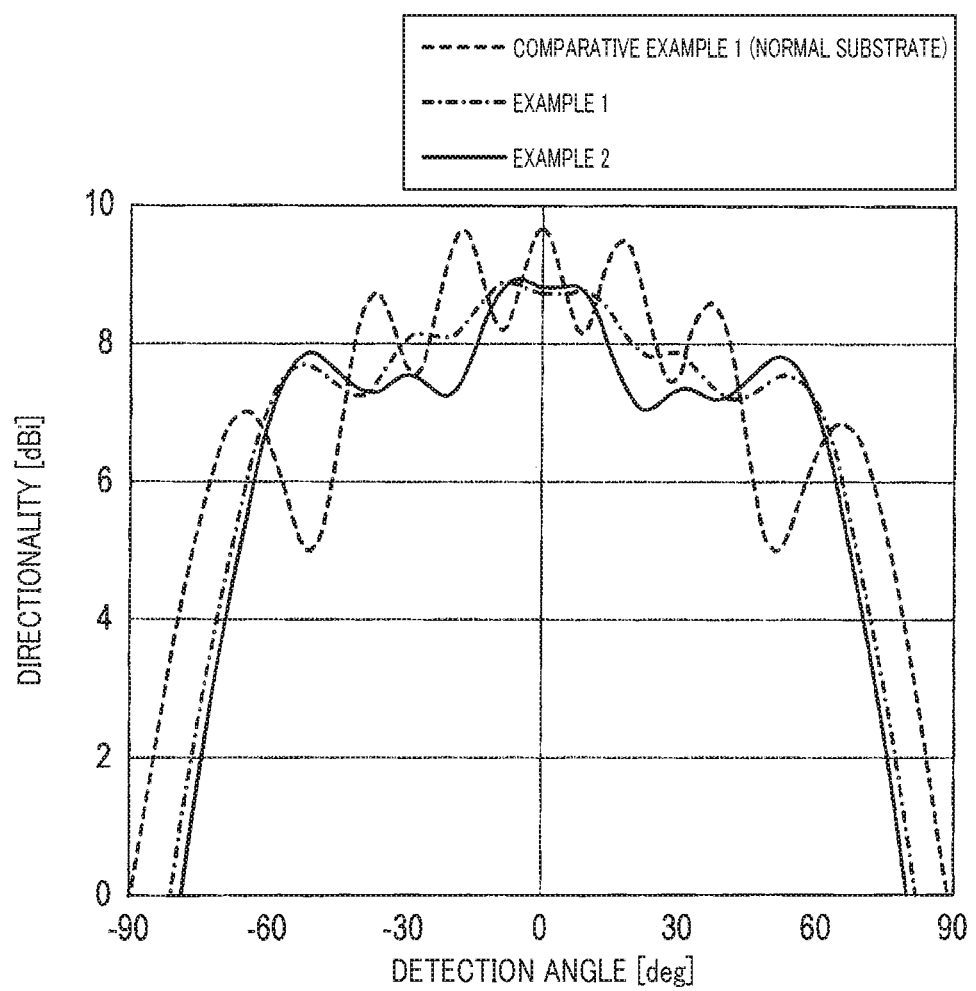
FIG. 10 is a graph showing the result of a simulation for determining the directionality of an antenna device.

Results of simulations for Example 1, Comparative Example 1, and Comparative Example 2 will be described with reference to FIGS. 9 to 12. As shown in FIG. 8, Example 1 uses a substrate on which the interruption unit 6 and the reflection unit 5 with the phase difference between adjacent blocks Bi set to a fixed value of 100 degrees are installed. Comparative Example 1 uses a normal substrate on which only the antenna unit 4 is installed. Comparative Example 2 uses a substrate on which the reflection unit 5 with the phase difference between adjacent blocks B set to a fixed value of 100 degrees is installed on the entire surface around the antenna unit 4. In Example 1, Comparative Example 1, and Comparative Example 2, the operating frequency was set to 24.15 GHz As shown in FIGS. 9 and 10, in Comparative Example 2, although the directionality in the direction at the detection angle of 0 degrees is higher than in Comparative Example 1, the ripples in the detection angle range of ±60 degrees are greater than in Comparative Example 1. In contrast, it can be seen that the ripples are suppressed from increasing across the detection angle range of ±90 degrees in Example 1.

Figure 11:
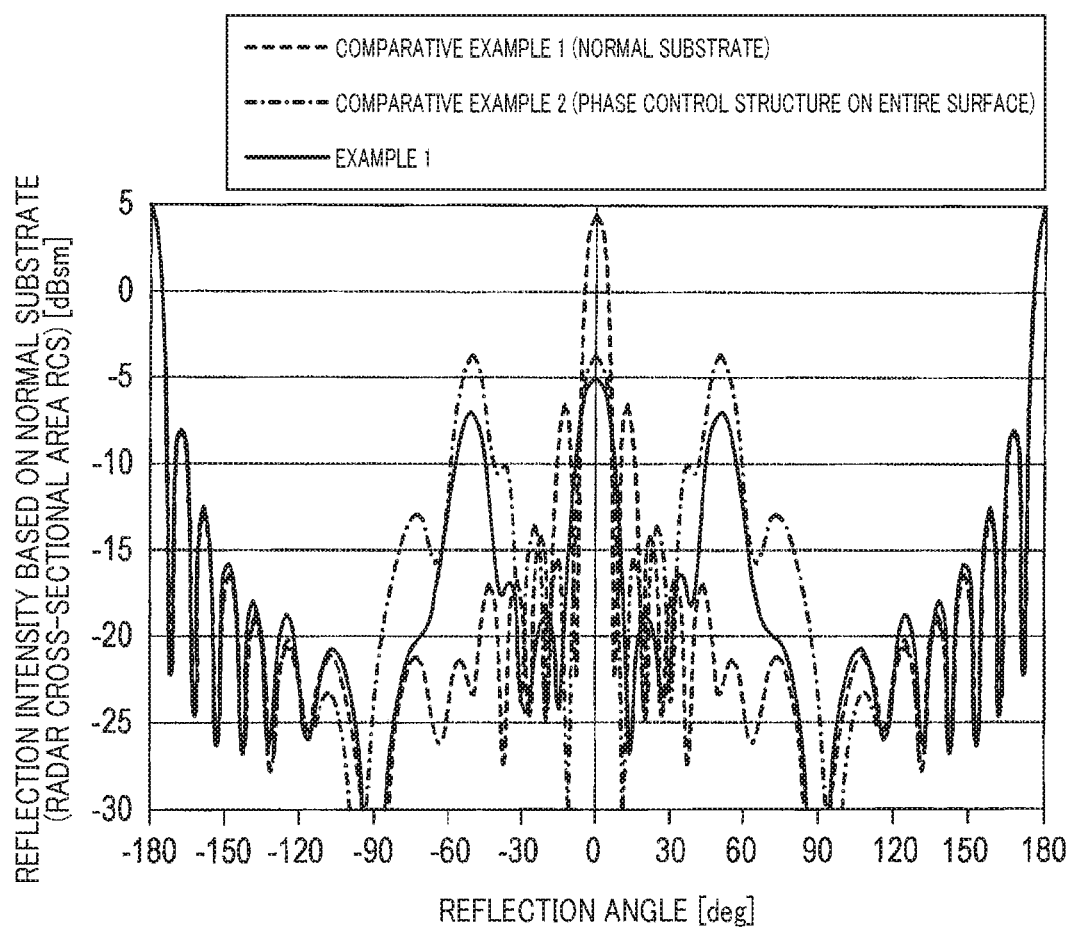
FIG. 11 is a graph showing the result of a simulation for determining, using the reflection intensity on a normal substrate as a reference, the reflection intensity upon light entry from a direction at a reflection angle of 0 degrees.
Figure 12:
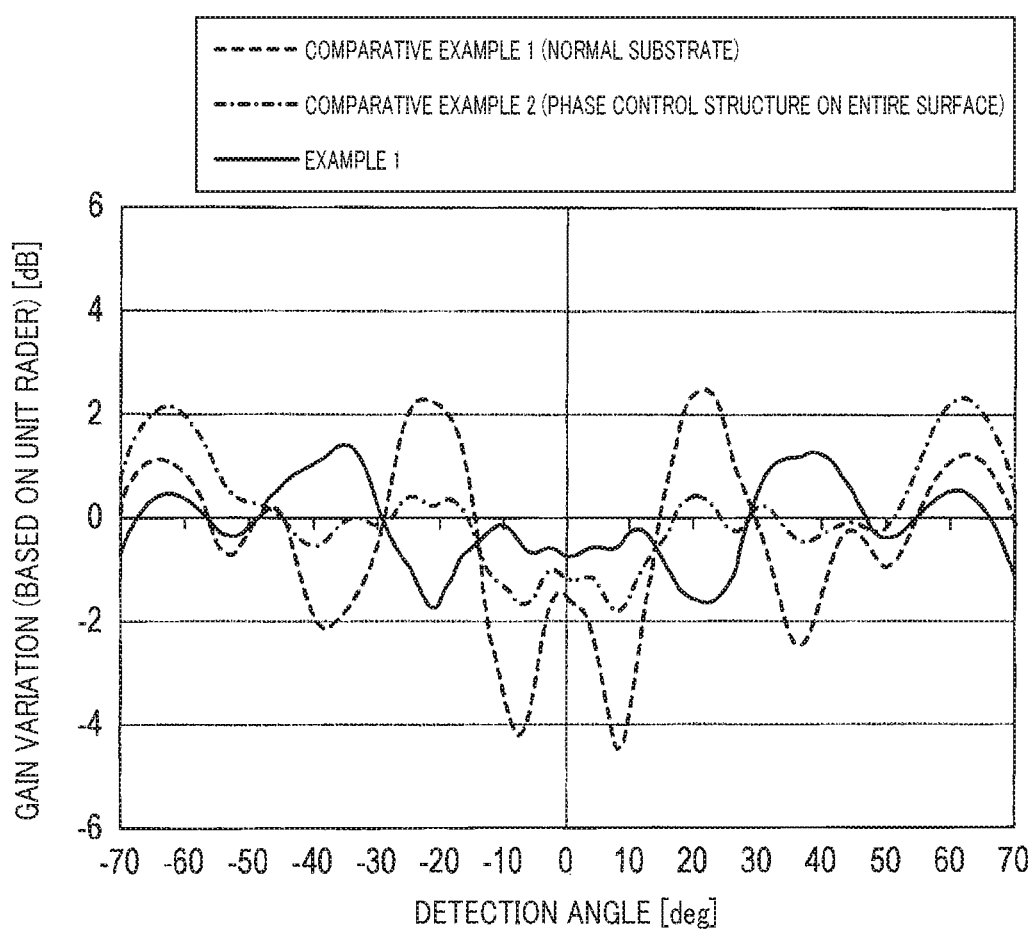
FIG. 12 is a graph showing the result of a simulation for determining, using an antenna gain in a case where no bumpers are present as a reference, the gain variation of an antenna gain resulting from the effect of interference based on a reflection wave due to the presence of a bumper.

As shown in FIG. 11, in Comparative Example 2, the reflection toward the vicinity at the reflection angle of 0 degrees is suppressed from occurring by 10 dBsm as compared to Comparative Example 1. In Example 1, the reflection toward the vicinity at the reflection angle of 0 degrees is also suppressed from occurring to the same extent as in Comparative Example 2. Thus, it can be seen that even when the reflection unit 5 is installed only in the direction orthogonal to the polarization direction of the radio wave, with respect to the antenna unit 4, the reflection toward the vicinity at the reflection angle of 0 degrees can be sufficiently suppressed from occurring, As shown in FIG. 12, compared to a situation where no bumpers are present, the presence of a bumper leads to a gain variation up to approximately 5 dB in Comparative Example 1, however, the gain variation is suppressed from occurring up to approximately 2.2 dB in Comparative Example 2. Furthermore, in Example 1, the gain variation is suppressed from occurring up to approximately 1.8 dB. Particularly, in Example 1, the gain variation is more significantly suppressed from occurring in the vicinity of the detection angle of 0 degrees than in Comparative Example 2.

Figure 13:
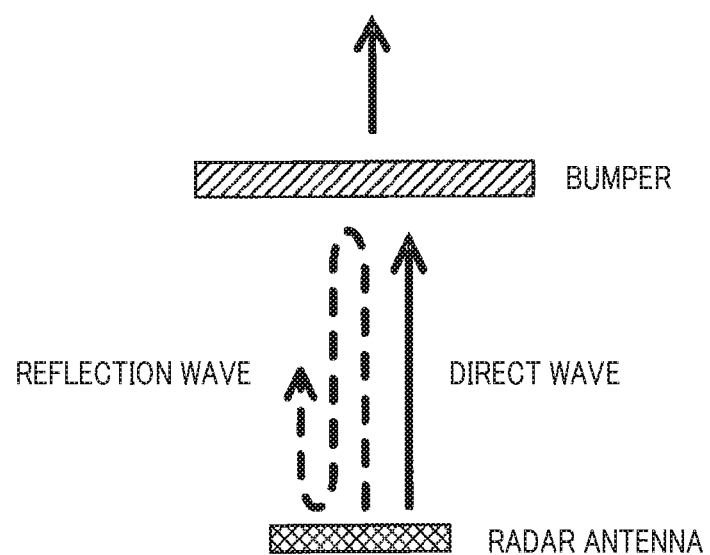
FIG. 13 is a schematic illustration of a reflection wave generated due to the bumper.

Note that when the bumper is present, as shown in FIG. 13, the direct wave radiated from the antenna device 1 is re-reflected off the radiation surface 2a of the antenna device 1, and the result of the re-reflected wave interfering with the direct wave is radiated to the outside via the bumper. Here, the distance from the radiation surface 2a to the bumper is set to 28 mm.

Second Embodiment

[1. Differences from First Embodiment]

Basic elements in a second embodiment are substantially the same as those in the first embodiment, and thus the differences therebetween will be mainly described; description of the elements common thereto will be omitted. Note that the same reference signs as those in the first embodiment represent the same elements, referring to the preceding descriptions.

In the above-mentioned first embodiment, the phase control structure of the reflection unit 5 is designed such that the phase difference between adjacent blocks Bi is equal. The second embodiment is different from the first embodiment in that the phase control structure of the reflection unit 5 is designed such that the phase difference between adjacent blocks Bi is different.

[2. Design]

While each block Bi is designed into a structure meeting the conditions (1) to (3) in the first embodiment, each block Bi is designed into a structure meeting the following condition (4) in addition to the above-mentioned conditions (1) and (2) in the second embodiment. The condition (4) is that the phase difference between adjacent blocks Bi increases, that is, has an inclination, with an increase in the distance from the block center. For example, the amount of an increase in the phase difference is set to 30 degrees; the phase difference of the block B1 is set to 0 degrees, the phase difference of the block B2 is set to 30 degrees, the phase difference of the block B3 is set to 90 degrees, the phase difference of the block B4 is set to 180 degrees, and so on.

Furthermore, as in the first embodiment, the sizes of the conductor patches P1 in all the blocks Bi are designed such that the preset phase difference can be obtained at the predetermined operating frequency. Specifically, using substantially the same relationship as that shown in FIG. 5, the sizes of the conductor patches P1 in all the blocks Bi are designed.

[3. Functions]

Figure 14:
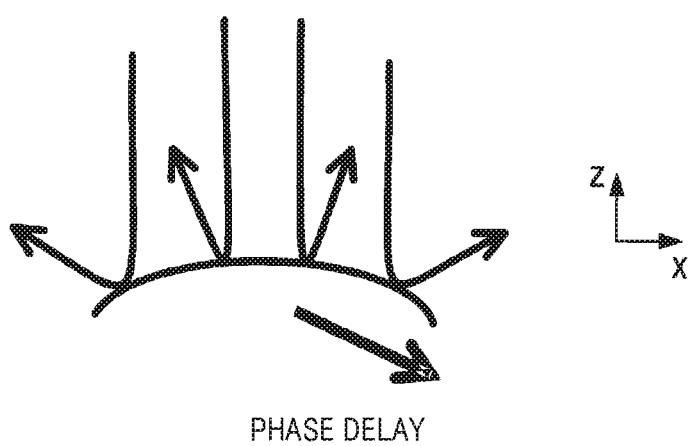
FIG. 14 is a schematic illustration of reflection directions on a radiation surface of a substrate with a gradual increase in the phase difference of a reflection wave occurring between conductor patches located in different blocks.

The present embodiment is designed such that the phase difference between the blocks Bi is inclined. Therefore, as shown in FIG. 14, the incident wave from the z-axis direction is reflected off the radiation surface 2a, and the phase of this reflection wave increases with an increase in the distance from the block center. Note that this phase delay increases in an accelerated manner with an increase in the distance from the block center. As a result, the reflection wave is reflected in a direction at a certain angle with respect to the arrival direction of the incident wave, and this reflection angle increases with an increase in the distance from the block center. This means that the reflection characteristic equivalent to that of the reflection on a curved substrate is obtained, and the reflection wave does not head in a fixed direction, but is scattered and heads in various directions.

[4. Advantageous Effects]

According to the second embodiment described above, the following advantageous effect is obtained in addition to the advantageous effects (1) and (2) of the first embodiment.

(3) Since the phase difference of the reflection wave between adjacent blocks B is non-uniformly different, the reflection wave incident on the reflection unit 5 can be reflected not in a fixed direction, but in various directions; in other words, the reflection wave can be scattered. Thus, the reflection intensity of the re-reflected wave heading in the same direction as the radiation wave can be curbed, and the re-reflection makes it possible to inhibit the formation, in a specific direction, of a strong beam different from a main beam. This enables reduced misdetection of a target.

Other Embodiments

Although the embodiments for implementing the present disclosure have been described above, the present disclosure is not limited to the above-described embodiments and can be implemented with various modifications.

Figure 15:
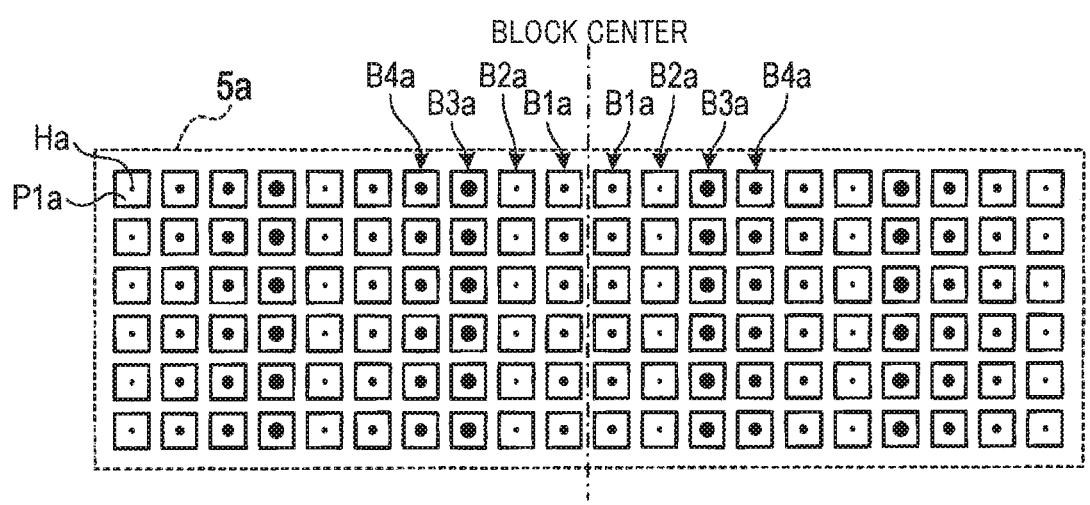
FIG. 15 is an x-y plan view of a reflection unit of an antenna device according to another embodiment.

(1a) In the above-mentioned embodiments, the delay phase is adjusted by changing the size of the conductor patch P1 while fixing the gap between the conductor patches P1 located in different blocks Bi, but this is not limited thereto. For example, as shown in FIG. 15, the reflection unit 5 may be configured as a reflection unit 5a in which the conductor patches P1a and through-holes Ha are two-dimensionally arranged. Furthermore, the delay phase may be adjusted by changing the diameter of the through-hole Ha while fixing the gap between the conductor patches P1a located in different blocks Bia and fixing the sizes of the conductor patches P1a in all the blocks Bia.

Figure 16:
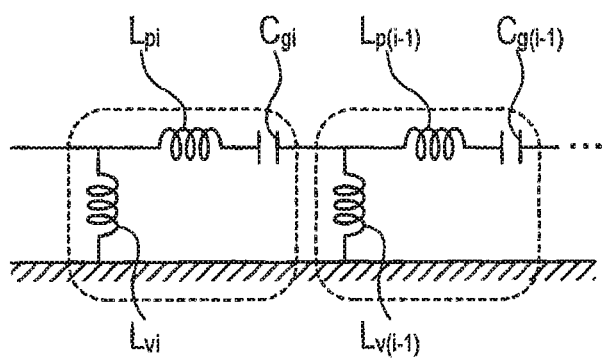
FIG. 16 is an equivalent circuit diagram of a reflection unit of an antenna device according to another embodiment.

In the reflection unit 5a, the conductor patch P1a and the through-hole Ha have an inductance component, and the gap between the conductor patches P1a has a capacitance component. As shown in FIG. 16, an equivalent circuit of the reflection unit 5a is a plurality of parallel-connected circuits. In each of the parallel-connected circuits, inductance $Lvi$ is connected between the ground plane 3 and a series-connected circuit per unit area including inductance $Lpi$ and capacitance $Cai$. The inductance $Lpi$ represents the inductance component of the conductor patch P1a per unit area, and the inductance $Lvi$ represents the inductance component of the through-hole Ha per unit area. The capacitance $Cgi$ represents the capacitance component in the gap between the conductor patches P1a per unit area. With a decrease in the diameter of the through-hole Ha, the inductance $Lvi$ increases, and the phase delay increases.

(1b) Alternatively, the delay phase may be adjusted by changing the gap between the conductor patches P1 located in different blocks Bi while setting the sizes of the conductor patches P1 in all the blocks Bi to the same size. In this case, instead of the graph shown in FIG. 5, it is sufficient to use the frequency characteristic with respect to the phase difference based on a normal substrate which is determined for each of the cases where the gap between the conductor patches changes while the size of the conductor patch P1 is fixed. The phase delay increases as the gap is set to a smaller value when the operating frequency is fixed and as the operating frequency is set higher when the gap is fixed.

Figure 17:
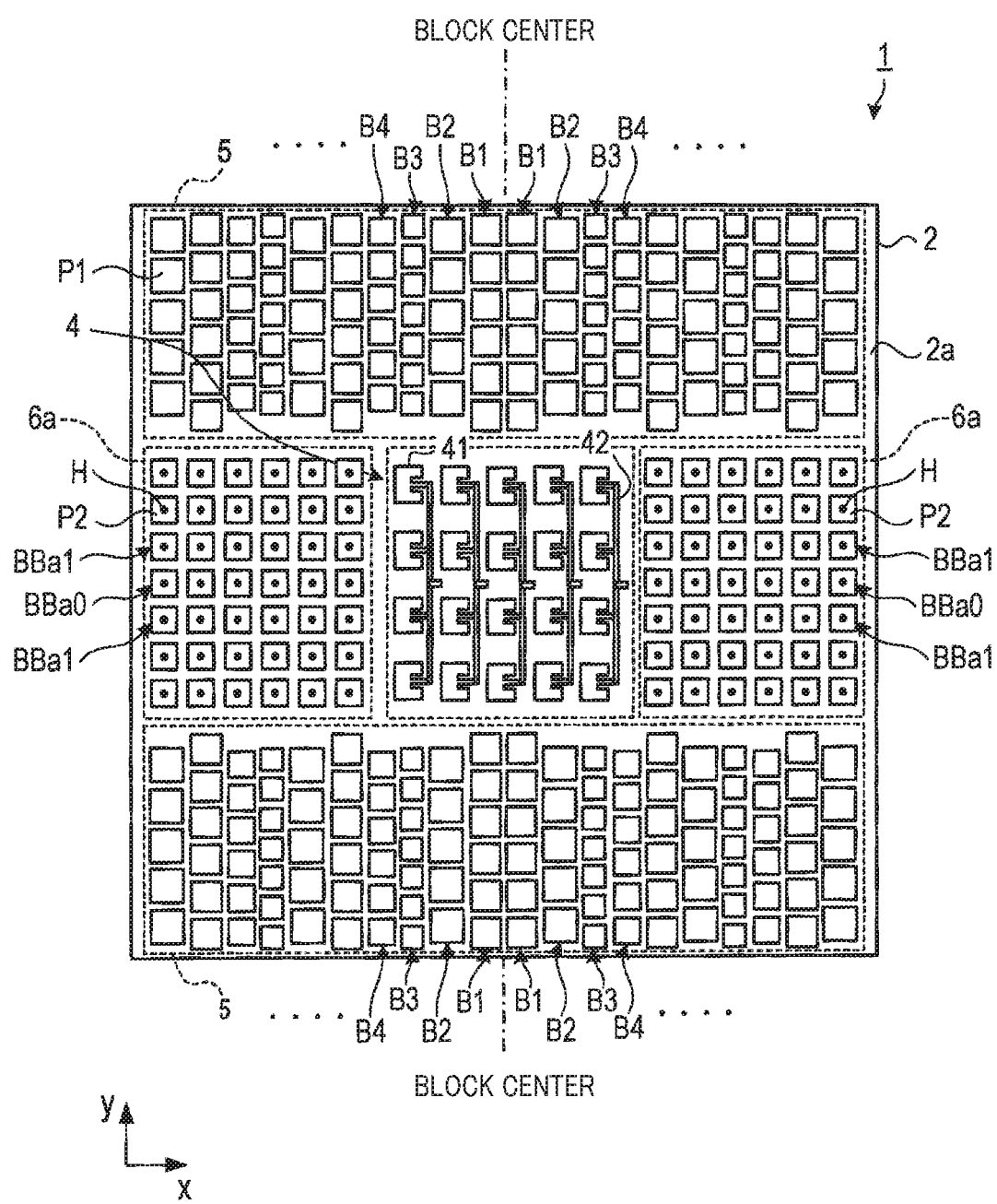
FIG. 17 is an x-y plan view which is a front view of an antenna device according to another embodiment.

(2) In the above-mentioned embodiments, the number of conductor patches P2 included in each block BBi of the interruption unit 6 is non-uniform, but this is not limited thereto. As shown in FIG. 17, the interruption unit 6 may be configured as an interruption unit 6a in which the number of conductor patches P2 included in each block BBai is equal. With this, although the interruption position of the surface current in the y-axis direction is fixed, a sufficient advantageous effect of interrupting the surface current can be obtained.

Figure 18:
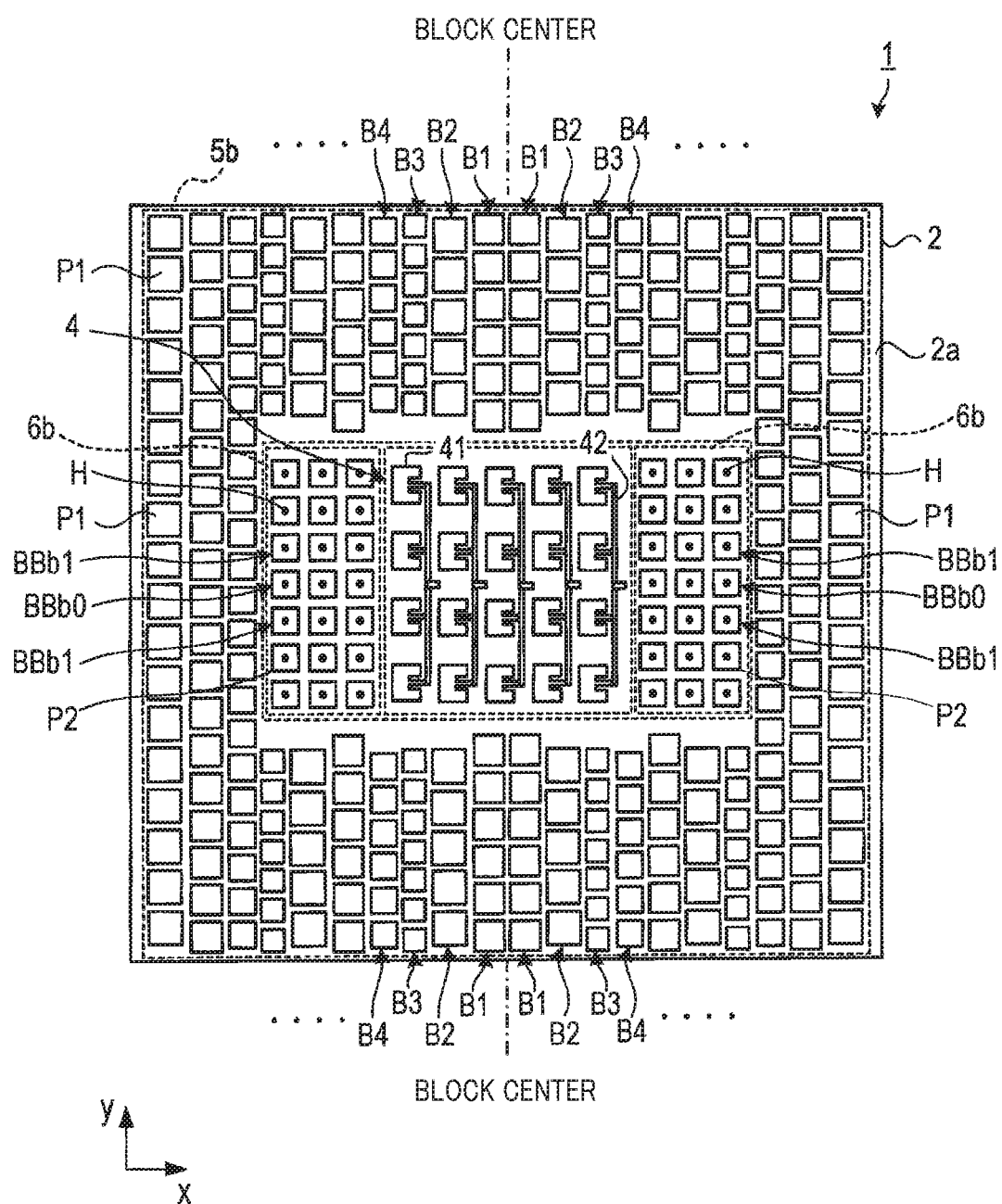
FIG. 18 is an x-y plan view which is a front view of an antenna device according to another embodiment.

(3) In the above-mentioned embodiments, only the interruption unit 6 is installed in the polarization direction of the radio wave, with respect to the antenna unit 4, but this is not limited thereto. As shown in FIG. 18, a portion of a reflection unit 5b may be installed opposite the antenna unit 4 across an interruption unit 6b. In other words, the area of the interruption unit 6b may be set smaller than the area of the interruption unit 6, and a portion of the reflection unit 5b may be installed in the resultant free space. The reflection unit 5b is disposed so as to surround the antenna unit 4 and the interruption unit 6b. Note that the number of conductor patches P2 included in each block BBbi of the interruption unit 6b needs to be set such that a sufficient advantageous effect of interrupting the surface current can be obtained. The number of conductor patches P2 included in each block BBbi of the interruption unit 6b may be the same or may be different. Thus, when a portion of the reflection unit 5b is installed in the polarization direction of the radio wave, with respect to the antenna unit 4, the effect of the reflection wave can be further suppressed from occurring.

FIG. 10 shows the result of a simulation for Example 2 which uses a substrate on which the interruption unit 6b and the reflection unit 5b with the phase difference between adjacent blocks BBbi set to a fixed value of 100 degrees are installed. It can be seen that also in Example 2, although not so much as in Example 1, the ripples are sufficiently suppressed from increasing.

(4) In the second embodiment, although the reflection unit 5 is designed so as to meet the conditions (1), (2), and (4), it is not necessarily necessary to meet all the conditions (1), (2), and (4) as long as the reflection wave can be scattered substantially evenly in various directions.

(5) A plurality of functions of one structural element in the above-mentioned embodiments may be implemented by more than one structural element, and one function of one structural element in the above-mentioned embodiments may be implemented by more than one structural element. Furthermore, a plurality of functions of more than one structural element in the above-mentioned embodiments may be implemented by one structural element, and one function implemented by more than one structural element in the above-mentioned embodiments may be implemented by one structural element. Furthermore, a portion of the configurations in the above-mentioned embodiments may be omitted. Furthermore, at least a portion of the configuration in each of the above-mentioned embodiments may be added to the configuration in another one of the above-mentioned embodiments or may be replaced by the configuration in another one of the above-mentioned embodiments. Note that all embodiments included in the technical idea specified by only the wording of the claims embodiments of the present disclosure.

(6) The present disclosure can be implemented in various forms including not only the above-described antenna device, but also a system including the antenna device as a structural element and a method for suppressing interference due to unnecessary reflection waves.

The invention claimed is:

1. An antenna device mounted in a bumper of a vehicle, the antenna device comprising:
a dielectric substrate;
a ground plane formed on one surface of the dielectric substrate and configured to function as an antenna ground surface;
an antenna unit formed on another surface of the dielectric substrate and including an antenna pattern configured to function as an array antenna;
a reflection unit including a plurality of first conductor patches disposed around the antenna unit and configured to function as a reflection plate, the reflection unit being configured to reflect an incident wave in a direction different from a direction of a radiation wave radiated from the antenna unit; and an interruption unit including a plurality of second conductor patches and a plurality of through-holes and configured to interrupt a surface current flowing on a surface of the dielectric substrate, the plurality of second conductor patches being disposed around the antenna unit, the plurality of through-holes permitting electrical conduction between each of the plurality of second conductor patches and the ground plane.

2. The antenna device according to claim 1, wherein the interruption unit is installed in a polarization direction of a radio wave transmitted and received by the antenna unit with respect to the antenna unit.

3. The antenna device according to claim 2, wherein a portion of the reflection unit is installed opposite the antenna unit with the interruption unit therebetween.

4. The antenna device according to claim 1, wherein the plurality of first conductor patches form a plurality of blocks arranged along a preset block alignment direction and have a structure in which a phase of a reflection wave at an operating frequency is different at each of the plurality of blocks and a phase difference of the reflection wave between adjacent blocks among the plurality of blocks is fixed at each of the adjacent blocks.

5. The antenna device according to claim 1, wherein the plurality of first conductor patches form a plurality of blocks arranged along a preset block alignment direction and have a structure in which a phase of a reflection wave at an operating frequency is different at each of the plurality of blocks and a phase difference of the reflection wave between adjacent blocks among the plurality of blocks is non-uniformly different at each of the adjacent blocks.

6. The antenna device according to claim 1, wherein each of the plurality of first conductor patches has a dimension of at most ¾ of an effective wavelength at a preset operating frequency.

7. The antenna device according to claim 1, wherein each of the plurality of second conductor patches has a dimension of at most ½ of an effective wavelength at a preset operating frequency.

8. The antenna device according to claim 4, wherein the reflection unit includes a plurality of through-holes permitting electrical conduction between each of the plurality of first conductor patches and the ground plane, and at each of the plurality of blocks, a through-hole permitting electrical conduction between a corresponding one of the plurality of first conductor patches and the ground plane is formed, the plurality of through-holes of the reflection unit having different diameters to adjust the phase of the reflection wave.

9. The antenna device according to claim 5, wherein the reflection unit includes a plurality of through-holes permitting electrical conduction between each of the plurality of first conductor patches and the ground plane, and at each of the plurality of blocks, a through-hole permitting electrical conduction between a corresponding one of the plurality of first conductor patches and the ground plane is formed, the plurality of through-holes of the reflection unit having different diameters to adjust the phase of the reflection wave.

* * * * *